(12) United States Patent
Lee et al.

(10) Patent No.: US 10,288,946 B2
(45) Date of Patent: May 14, 2019

(54) FLEXIBLE LIQUID CRYSTAL PANEL AND MANUFACTURE METHOD THEREOF

(71) Applicant: Shenzhen China Star Optoelectronics Technology Co., Ltd., Shenzhen, Guangdong (CN)

(72) Inventors: Yungjui Lee, Guangdong (CN); Xinhui Zhong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/822,126

(22) Filed: Nov. 25, 2017

(65) Prior Publication Data

US 2018/0074354 A1    Mar. 15, 2018

Related U.S. Application Data

(62) Division of application No. 14/423,705, filed on Feb. 24, 2015, now Pat. No. 9,891,474.

(51) Int. Cl.

| | | |
|---|---|---|
| *G02F 1/1339* | (2006.01) | |
| *G02F 1/1333* | (2006.01) | |
| *G02F 1/1335* | (2006.01) | |
| *G02F 1/1341* | (2006.01) | |
| *G02F 1/1343* | (2006.01) | |

(Continued)

(52) U.S. Cl.
CPC .......... *G02F 1/1339* (2013.01); *G02F 1/1341* (2013.01); *G02F 1/1368* (2013.01); *G02F 1/13394* (2013.01); *G02F 1/13439* (2013.01); *G02F 1/133305* (2013.01); *G02F 1/133514* (2013.01); *G02F 1/133516* (2013.01); *G02F 1/133528* (2013.01); *G02F 1/136286* (2013.01);

(Continued)

(58) Field of Classification Search
CPC ............. G02F 1/1339; G02F 1/133305; G02F 1/133514; G02F 1/133516; G02F 1/133528; G02F 1/1341; G02F 1/13539; G02F 1/136286; G02F 1/1368
See application file for complete search history.

(56) References Cited

U.S. PATENT DOCUMENTS 5,473,450 A * 12/1995 Yamada ............ G02F 1/133377
349/84
5,576,856 A * 11/1996 Kawazu ............ G02F 1/133377
349/89

(Continued)

*Primary Examiner* — James A Dudek
(74) *Attorney, Agent, or Firm* — Andrew C. Cheng

(57) ABSTRACT

A flexible liquid crystal panel includes a first and a second flexible substrates opposite to each other, a first and a second flat layers arranged on inner sides of the first and second flexible substrates respectively, a color filter layer arranged between the second flexible substrate and the second flat layer, a spacing retaining wall formed on the second flat layer, seal glue coated on a side of the spacing retaining wall adjacent to the first flexible substrate, and liquid crystal filled between the first and second flat layers. The spacing retaining wall includes a plurality of transverse parts parallel with one another and extending transversely and a plurality of longitudinal parts parallel with one another and extending longitudinally. The transverse parts and the longitudinal parts intersect one another to separate a plurality of sub pixels and define and delimit closed areas in which the liquid crystal is filled.

16 Claims, 9 Drawing Sheets

(51) Int. Cl.
 *G02F 1/1362* (2006.01)
 *G02F 1/1368* (2006.01)
(52) U.S. Cl.
 CPC ............ *G02F 2001/136295* (2013.01); *G02F 2201/123* (2013.01); *G02F 2202/28* (2013.01)

(56) References Cited

U.S. PATENT DOCUMENTS

| | | | | | |
|---|---|---|---|---|---|
| 5,583,675 | A * | 12/1996 | Yamada | ............ | G02F 1/133377 349/106 |
| 5,612,803 | A * | 3/1997 | Yamada | ............ | G02F 1/133377 349/156 |
| 5,621,553 | A * | 4/1997 | Nishiguchi | ....... | G02F 1/133377 349/153 |
| 5,625,473 | A * | 4/1997 | Kondo | ............. | G02F 1/133377 349/153 |
| 5,627,665 | A * | 5/1997 | Yamada | ............ | G02F 1/133377 349/156 |
| 5,668,651 | A * | 9/1997 | Yamada | ............ | G02F 1/133377 349/117 |
| 5,706,109 | A * | 1/1998 | Yamada | ............ | G02F 1/133377 349/181 |
| 5,726,728 | A * | 3/1998 | Kondo | ............. | G02F 1/133377 349/122 |
| 5,766,694 | A * | 6/1998 | West | .................... | G02F 1/13394 349/156 |
| 5,831,703 | A * | 11/1998 | Nishiguchi | ....... | G02F 1/133377 349/117 |
| 5,956,112 | A * | 9/1999 | Fujimori | ........... | G02F 1/133305 349/156 |
| 7,466,390 | B2 * | 12/2008 | French | ............. | G02F 1/133305 349/158 |
| 8,582,072 | B2 * | 11/2013 | Okabe | ................ | B29D 11/0073 349/158 |
| 2001/0026347 | A1 * | 10/2001 | Sawasaki | .......... | G02F 1/133707 349/156 |
| 2002/0063831 | A1 * | 5/2002 | Nam | ................. | G02F 1/133788 349/124 |
| 2002/0067450 | A1 * | 6/2002 | Moriya | ............... | G02F 1/13394 349/129 |
| 2003/0002004 | A1 * | 1/2003 | Kouya | ................ | G02F 1/13394 349/155 |
| 2003/0145949 | A1 * | 8/2003 | Tanaka | ................ | C08G 59/027 156/330 |
| 2004/0032563 | A1 * | 2/2004 | Nakasu | ................. | G02F 1/1341 349/187 |
| 2005/0095370 | A1 * | 5/2005 | Ellis | ........................... | C09J 4/00 427/516 |
| 2005/0256241 | A1 * | 11/2005 | Sachdev | .................. | C08K 3/08 524/439 |
| 2006/0098153 | A1 * | 5/2006 | Slikkerveer | ....... | G02F 1/133305 349/187 |
| 2006/0103784 | A1 * | 5/2006 | Liu | .................... | G02F 1/133707 349/106 |
| 2006/0209246 | A1 * | 9/2006 | Kim | ................... | G02F 1/133377 349/155 |
| 2007/0091062 | A1 * | 4/2007 | French | .............. | G02F 1/133305 345/107 |
| 2007/0158869 | A1 * | 7/2007 | Yanagida | ................ | B32B 27/18 264/173.12 |
| 2008/0068553 | A1 * | 3/2008 | Tomita | ................ | G02F 1/13394 349/153 |
| 2008/0111965 | A1 * | 5/2008 | Tomita | .............. | G02F 1/133305 349/156 |
| 2011/0228190 | A1 * | 9/2011 | Yang | .................... | G02F 1/13394 349/56 |
| 2013/0016308 | A1 * | 1/2013 | Urayama | ............ | G02F 1/13394 349/61 |
| 2013/0027652 | A1 * | 1/2013 | Urayama | ............ | G02F 1/13394 349/153 |
| 2013/0084459 | A1 * | 4/2013 | Larson | ........................ | C09J 4/00 428/422 |
| 2015/0349288 | A1 * | 12/2015 | Luo | ..................... | H01L 51/5237 257/99 |
| 2015/0376488 | A1 * | 12/2015 | Tan | ........................ | C09K 5/14 427/387 |
| 2016/0109746 | A1 * | 4/2016 | Lee | ........................ | G02F 1/1337 349/43 |
| 2016/0202520 | A1 * | 7/2016 | Hong | .................. | G02F 1/13394 349/43 |
| 2016/0202576 | A1 * | 7/2016 | Baek | .................. | G02F 1/133377 349/86 |
| 2016/0231607 | A1 * | 8/2016 | Wu | ........................ | G02F 1/1339 |
| 2016/0252768 | A1 * | 9/2016 | Zhong | ............... | G02F 1/133512 349/43 |
| 2016/0363789 | A1 * | 12/2016 | Jing | ........................ | B30B 1/38 |
| 2017/0022393 | A1 * | 1/2017 | Kim | ........................ | C09J 4/00 |
| 2017/0096585 | A1 * | 4/2017 | Fathi | ........................ | C09J 5/00 |
| 2018/0074354 | A1 * | 3/2018 | Lee | .................... | G02F 1/133305 |

* cited by examiner

FLEXIBLE LIQUID CRYSTAL PANEL AND MANUFACTURE METHOD THEREOF

CROSS REFERENCE TO RELATED APPLICATIONS

This is a divisional application of co-pending patent application Ser. No. 14/423,705, filed on Feb. 24, 2015, which is a national stage of PCT Application Number PCT/CN2015/072501, filed on Feb. 9, 2015, claiming foreign priority of Chinese Patent Application Number 201410683142.2, filed on Nov. 24, 2014.

FIELD OF THE INVENTION

The present invention relates to a display technology field, and more particularly to a flexible liquid crystal panel and a manufacture method thereof.

BACKGROUND OF THE INVENTION

With the gradual population of wearable application devices, such as smart glasses, smart phone, et cetera, the demands for flexible display in the display industry have constantly increased.

An Organic Light Emitting Diodes Display (OLED) possesses properties of self-illumination, no required back light, being ultra thin, wide view angle, fast response and etc., and accordingly has the nature advantage of flexible display. However, the OLED industry remains the extremely high bar of technology. The difficulty of the manufacture process is high. The yield is low and the cost, the selling prices are high. These drawbacks get in way of wide applications of the OLED.

Liquid Crystal Display (LCD) is the most widely used display devices in the market. The production technology is quite mature. The yield of the production is high. The cost is relatively low and the acceptance is high in the market.

Normally, the liquid crystal display comprises a shell, a liquid crystal display panel located in the shell and a backlight module located in the shell. The liquid crystal panel comprises a color filter (CF) substrate, a thin-film transistor (TFT) array substrate and a liquid crystal layer filled between the two substrates. Transparent electrodes are formed on inner sides of the CF substrate and the TFT substrate. The liquid crystal display performs control to the orientation of the liquid crystal molecules in the liquid crystal layer with an electric field to change the polarization state of the light. The objective of displaying is achieved with the polarizer to realize the transmission and the obstruction of the optical path.

At present, most of LCD productions, and particularly the large scale LCDs, utilize photo spacer (PS) to control a cell gap. FIG. 1 is a structural diagram of a liquid crystal panel according to prior art in a plane state. The liquid crystal material in the liquid crystal layer 300 is a fluid, which is flowable. The TFT substrate 100 and the CF substrate 200 are supported by the photo spacers 400 arranged between the two substrates. As shown in FIGS. 3 and 4, the photo spacers 400 are generally formed with a photolithographic process in a specific area in a display side, which is commonly in a black matrix (BM) 201 for maintaining the thickness and the stability of the liquid crystal layer 300.

Such photo spacers 400 cannot stop the liquid crystal material to flow in the entire liquid crystal panel. Although the liquid crystal panel shown in FIG. 1 can satisfy the display evenness demands when the liquid crystal panel in a plane state. The cell gap of the liquid crystal layer 300 is kept around the design value, and the cell gap is more even. However, after the liquid crystal panel previously in the plane state is bent, as shown in FIG. 2, the TFT substrate 100 and the CF substrate 200 are misaligned and the curvatures do not match. The liquid crystal material is pressed and flowing. Ultimately, it results in that the uneven cell gap at various positions of the liquid crystal layer. The thickness of the liquid crystal layer 300 is uneven to result in abnormal displaying.

The common liquid crystal panels in the main market can be categorized in three types, which are respectively twisted nematic/super twisted nematic (TN/STN) types, in-plane switching (IPS) type and vertical alignment (VA) type. Although the principles of liquid crystal display adjustment may be of differences, the basic structures of these three types of liquid crystal panel are similar. The displaying property and the cell gap of the liquid crystal layer are closely related. Whether the cell gap of the liquid crystal layer is even has direct influence on the displaying effect. Changing the cell gap of the liquid crystal layer will affect the displaying brightness, contrast, response speed, etc. of the liquid crystal panel. Therefore, improvement is necessary to the known liquid crystal panel to solve the issue of uneven cell gap caused by a bent liquid crystal layer for making the liquid crystal panel adaptable for flexible displaying.

SUMMARY OF THE INVENTION

An objective of the present invention is to provide a flexible liquid crystal panel for stably supporting the cell gap between the two substrates, and firmly blocking the flow of the liquid crystals in the panel, and the evenness of the cell gap in a liquid crystal layer of a bent liquid crystal panel can be well maintained for being adaptable for flexible display.

Another objective of the present invention is to provide a manufacture method of a flexible liquid crystal panel to eliminate the issue of the uneven cell gap in a liquid crystal layer of a bent liquid crystal panel according to prior art to allow the liquid crystal panel adaptable for flexible display.

For realizing the aforesaid objectives, the present invention provides a flexible liquid crystal panel, which comprises a first flexible substrate and a second flexible substrate oppositely located with the first flexible substrate, a first flat layer located at an inner side of the first flexible substrate, a second flat layer located at an inner side of the second flexible substrate, a color filter layer located between the second flexible substrate and the second flat layer, a spacing retaining wall located on the second flat layer, seal glue coated on a side of the spacing retaining wall close to the first flexible substrate and employed for adhering the first flat layer and a liquid crystal layer filled between the first flat layer and the second flat layer;

wherein the spacing retaining wall comprises a plurality of transverse parts parallel with one another and extending transversely and a plurality of longitudinal parts parallel with one another and extending longitudinally, and the transverse parts and the longitudinal parts interlace with one another to separate a plurality of sub pixels, and the liquid crystal layer is filled in closed districts formed by the transverse parts and the longitudinal parts interlacing with one another.

Both the first flexible substrate and the second flexible substrate are plastic substrates.

The seal glue is UV-curing and heat-curing complex glue, and is cured by a complex way of UV curing and heat curing;

the compositions of the seal glue are prepolymer resin, viscosity modifier, photoinitiator, heat curing agent and filler;

a ratio of total weight of the prepolymer resin is 10%-60%, and the prepolymer resin comprises one or many of prepolymer resins having polymerizable group, wherein the at least one prepolymer resin comprises acrylate group of UV curing and epoxy group of heat curing;

a ratio of total weight of the viscosity modifier is 5%-30%, and the viscosity modifier is reactive monomer having polymerizable group which the molecular weight is smaller and the viscosity is lower;

a ratio of total weight of the photoinitiator is 0.05%-1%, and the photoinitiator is a CIBA IRGACURE series of photoinitiator;

a ratio of total weight of the heat curing agent is 10%-40%, and the heat curing agent is a compound of anhydride series or amine series; and a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

The flexible liquid crystal panel further comprises a lower polarizer adhered to an outer side of the first flexible substrate, and an upper polarizer adhered to an outer side of the second flexible substrate.

The flexible liquid crystal panel further comprises gate lines, data lines, TFTs and ITO pixel electrodes located on an inner side of the first flexible substrate; and an ITO common electrode located on an inner side of the second flexible substrate.

The spacing retaining wall is manufactured with a photo process; the seal glue is coated by transfer printing; and liquid crystal of the liquid crystal layer is injected by spraying.

The present invention further provides a manufacture method of a liquid crystal display panel structure, which comprises the following steps:

step 1, providing a first flexible substrate and a second flexible substrate, and respectively adhering the first and second flexible substrates with a first and a second glass substrates;

step 2, manufacturing gate lines, data lines, TFTs and ITO pixel electrodes on an inner side of the first flexible substrate and deposing a first flat layer, and manufacturing a color filter layer and an ITO common electrode on an inner side of the second flexible substrate and deposing a second flat layer;

step 3, manufacturing a spacing retaining wall on a second flat layer at a side of the second flexible substrate;

wherein the spacing retaining wall comprises a plurality of transverse parts parallel with one another and extending transversely and a plurality of longitudinal parts parallel with one another and extending longitudinally, and the transverse parts and the longitudinal parts interlace with one another to separate a plurality of sub pixels;

step 4, coating seal glue on a side of the spacing retaining wall away from the second flexible substrate;

step 5, filling liquid crystal in closed districts formed by the transverse parts and the longitudinal parts of the spacing retaining wall interlacing with one another to form a liquid crystal layer;

step 6, oppositely vacuum laminating the first flexible substrate and the second flexible substrate;

step 7, curing the seal glue in a combined way of UV irradiation and heating; and step 8, stripping the first and second glass substrates.

The manufacture method of the flexible liquid crystal panel further comprises step 9 of respectively adhering a lower polarizer and an upper polarizer to outer sides of the first flexible substrate and the second flexible substrate.

Both the first flexible substrate and the second flexible substrate are plastic substrates.

The spacing retaining wall is manufactured with a photo process; the seal glue is coated by transfer printing; and the liquid crystal is injected to form the liquid crystal layer by spraying;

the seal glue is UV-curing and heat-curing complex glue, and is cured by a complex way of UV curing and heat curing;

the compositions of the seal glue are prepolymer resin, viscosity modifier, photoinitiator, heat curing agent and filler;

a ratio of total weight of the prepolymer resin is 10%-60%, and the prepolymer resin comprises one or many of prepolymer resins having polymerizable group, wherein the at least one prepolymer resin comprises acrylate group of UV curing and epoxy group of heat curing;

a ratio of total weight of the viscosity modifier is 5%-30%, and the viscosity modifier is reactive monomer having polymerizable group which the molecular weight is smaller and the viscosity is lower;

a ratio of total weight of the photoinitiator is 0.05%-1%, and the photoinitiator is a CIBA IRGACURE series of photoinitiator;

a ratio of total weight of the heat curing agent is 10%-40%, and the heat curing agent is a compound of anhydride series or amine series; and a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

The present invention further provides a manufacture method of a liquid crystal display panel structure, which comprises the following steps:

step 1, providing a first flexible substrate and a second flexible substrate, and respectively adhering the first and second flexible substrates with a first and a second glass substrates;

step 2, manufacturing gate lines, data lines, TFTs and ITO pixel electrodes on an inner side of the first flexible substrate and deposing a first flat layer, and manufacturing a color filter layer and an ITO common electrode on an inner side of the second flexible substrate and deposing a second flat layer;

step 3, manufacturing a spacing retaining wall on a second flat layer at a side of the second flexible substrate;

wherein the spacing retaining wall comprises a plurality of transverse parts parallel with one another and extending transversely and a plurality of longitudinal parts parallel with one another and extending longitudinally, and the transverse parts and the longitudinal parts interlace with one another to separate a plurality of sub pixels;

step 4, coating seal glue on a side of the spacing retaining wall away from the second flexible substrate;

step 5, filling liquid crystal in closed districts formed by the transverse parts and the longitudinal parts of the spacing retaining wall interlacing with one another to form a liquid crystal layer;

step 6, oppositely vacuum laminating the first flexible substrate and the second flexible substrate;

step 7, curing the seal glue in a combined way of UV irradiation and heating; and step 8, stripping the first and second glass substrates;

wherein the manufacture method of the flexible liquid crystal panel further comprises step 9 of respectively adhering a lower polarizer and an upper polarizer to outer sides of the first flexible substrate and the second flexible substrate; and wherein both the first flexible substrate and the second flexible substrate are plastic substrates.

The benefits of the present invention are that in the flexible liquid crystal panel of the present invention, by locating the spacing retaining wall at a side of the second flexible substrate, and coating the seal glue at a side of the spacing retaining wall close to the first flexible substrate to bond the first and the second flexible substrates together for stably supporting the cell gap between the two substrates, and firmly blocking the flow of the liquid crystals in the panel, the evenness of the cell gap in a liquid crystal layer of a bent liquid crystal panel can be well maintained for being adaptable for flexible display. In the manufacture method of the flexible liquid crystal panel according to the present invention, the spacing retaining wall is manufactured by photo process and the seal glue is coated at a side of the spacing retaining wall away from the second flexible substrate by transfer printing. Thus, the issue of the uneven cell gap in a liquid crystal layer of a bent liquid crystal panel according to prior art is eliminated to allow the liquid crystal panel adaptable for flexible display.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
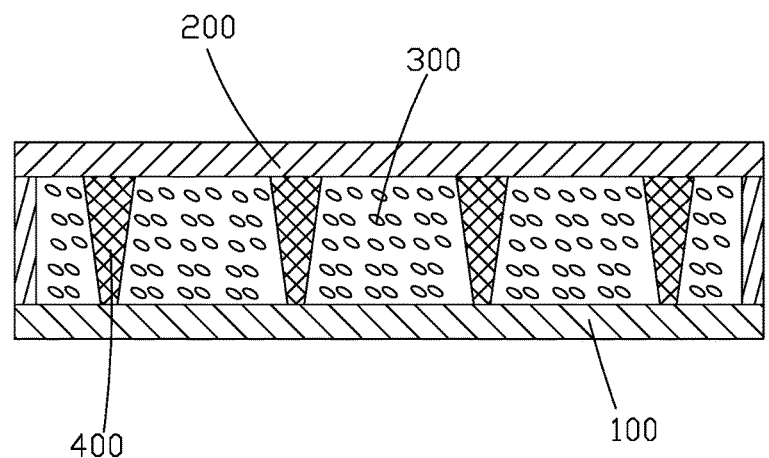
FIG. 1 is a structural diagram of a liquid crystal panel according to the prior art in a plane state.
Figure 2:
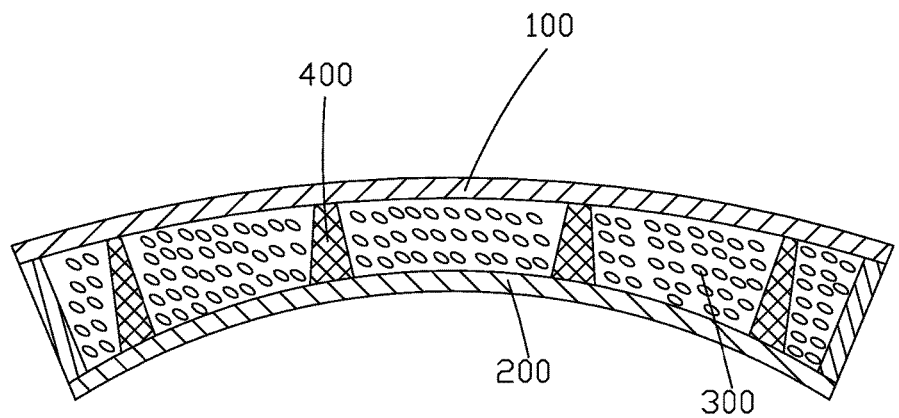
FIG. 2 is a structural diagram of a liquid crystal panel according to the prior art in a curved state.
Figure 3:
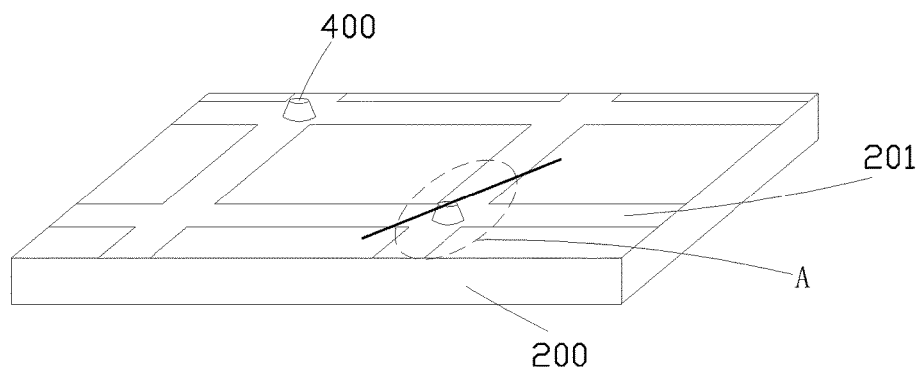
FIG. 3 is a stereo diagram of photo spacers in the liquid crystal panel according to the prior art.
Figure 4:
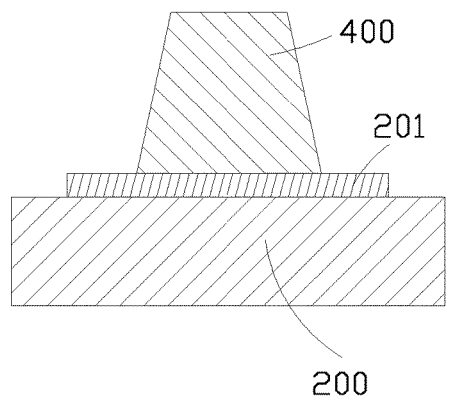
FIG. 4 is a sectional diagram corresponding to "A" section of FIG. 3.
Figure 5:
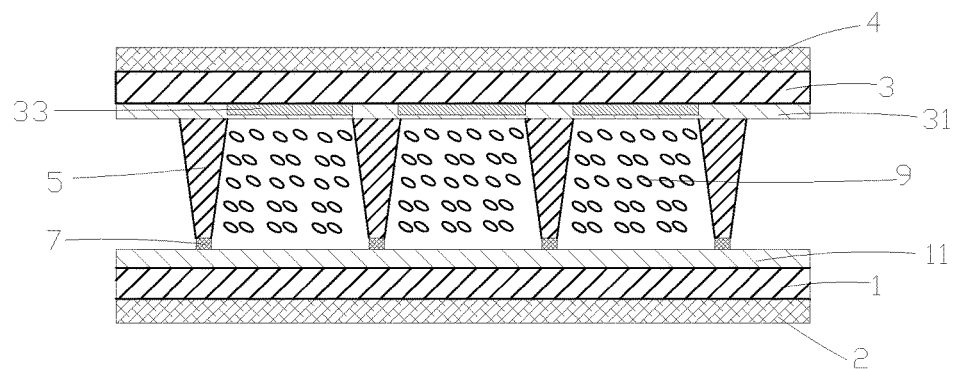
FIG. 5 is a sectional structure diagram of a flexible liquid crystal panel according to the present invention.
Figure 6:
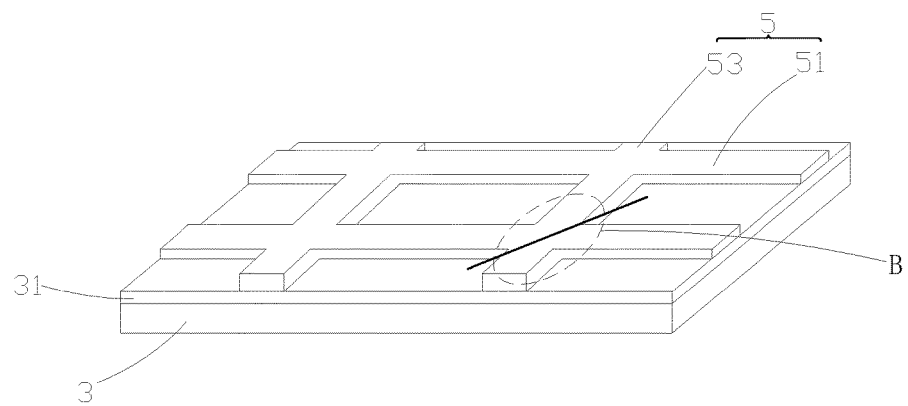
FIG. 6 is a stereo diagram of the spacing retaining wall in the liquid crystal panel according to the present invention.
Figure 7:
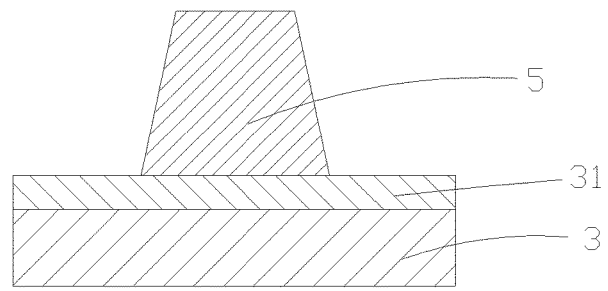
FIG. 7 is a sectional diagram corresponding to "B" section of FIG. 6.

Referring to FIG. 5-7, firstly, the present invention provides a liquid crystal display panel structure. The flexible liquid crystal panel comprises a first flexible substrate 1 and a second flexible substrate 3 opposite to the first flexible substrate 1, a first flat layer 11 located on an inner side of the first flexible substrate 1, a second flat layer 31 located on an inner side of the second flexible substrate 3, a color filter layer 33 located between the second flexible substrate 3 and the second flat layer 31, a spacing retaining wall 5 located on the second flat layer 31, seal glue 7 coated on a side of the retaining wall 5 close to the first flexible substrate 1 and adherable to the first flat layer 11, and a liquid crystal layer 9 filled between the first flat layer 11 and the second flat layer 31, and further comprises a lower polarizer 2 adhered to an outer side of the first flexible substrate 1 and an upper polarizer 4 adhered to an outer side of the second flexible substrate 3.

The spacing retaining wall 5 comprises a plurality of transverse parts 51 parallel with one another and extending transversely and a plurality of longitudinal parts 53 parallel with one another and extending longitudinally, and the transverse parts 51 and the longitudinal parts 53 interlace with one another to separate a plurality of sub pixels. The liquid crystal layer 9 is filled in closed districts formed by the transverse parts 51 and the longitudinal parts 53 interlacing with one another.

The spacing retaining wall 5 is manufactured with a photo process. The seal glue 7 is coated by transfer printing. The liquid crystal of the liquid crystal layer 9 are injected by spraying.

Both the first flexible substrate 1 and the second flexible substrate 3 are transparent and flexible. Specifically, both the first flexible substrate 1 and the second flexible substrate 3 are plastic substrates, and preferably, the first flexible substrate 1 and the second flexible substrate 3 are polyimide (PI) substrates or polyethylene glycol terephthalate (PET) substrates.

Specifically, the seal glue 7 is UV-curing and heat-curing complex glue, and is cured by a complex way of UV curing and heat curing. The compositions of the seal glue 7 are prepolymer resin, viscosity modifier, photoinitiator, heat curing agent and filler.

Specifically, a ratio of total weight of the prepolymer resin is 10%-60%, and the prepolymer resin comprises one or many of prepolymer resins having polymerizable group (such as: acrylate group, methacrylate group, epoxy group), wherein the at least one prepolymer resin comprises acrylate group of UV curing and epoxy group of heat curing. It can be but not restricted to be:

the inner side of the first flexible substrate 1, which are equivalent to a TFT substrate of a known liquid crystal panel.

Figure 9:
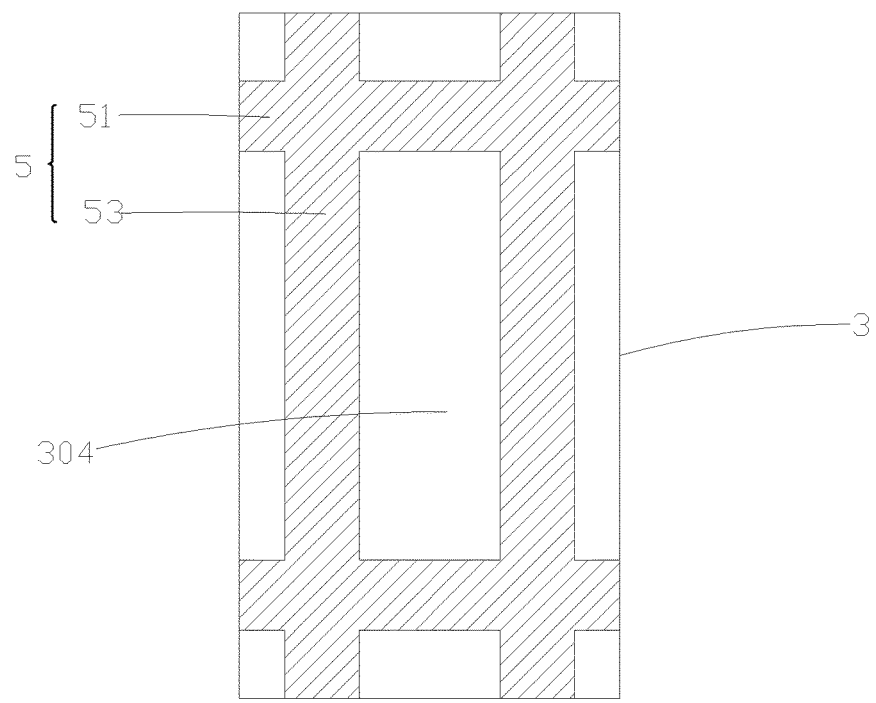
FIG. 9 is a plan diagram of one side of the second flexible substrate in the liquid crystal panel according to the present invention.

As shown in FIG. 9, an ITO common electrode 304 is located on the inner side of the second flexible substrate 3, which is equivalent to a CF substrate of a known liquid crystal panel.

The liquid crystal layer 9 is filled in closed districts formed by the transverse parts 51 and the longitudinal parts 53 of the spacing retaining wall 5 interlacing with one

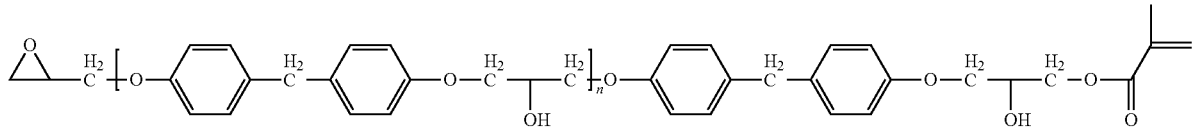

where n is an integer of 0-10.

A ratio of total weight of the viscosity modifier is 5%-30%, and the viscosity modifier is reactive monomer having polymerizable group which the molecular weight is smaller and the viscosity is lower. It can be but not restricted to be:

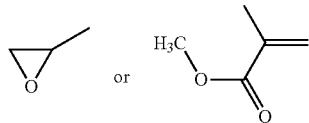

A ratio of total weight of the photoinitiator is 0.05%-1%, and the photoinitiator can be a CIBA IRGACURE series of photoinitiator, such as CIBA IRGACURE651, and the structure is provided below:

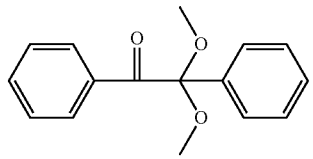 [SMILES: COC(OC)(C(=O)c1ccccc1)c1ccccc1]

A ratio of total weight of the heat curing agent is 10%-40%, and the heat curing agent is a compound of anhydride series or amine series. It can be but not restricted to be:

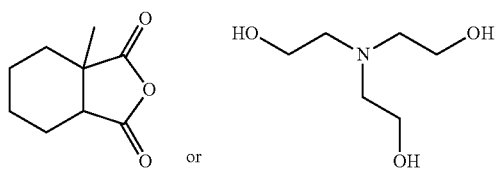

A ratio of total weight of the filler is 5%-20%, and the filler is inorganic granular substance selected from silicon dioxide, aluminum oxide, zinc oxide, titanium oxide, magnesium oxide, calcium sulfate, aluminum nitride or silicon nitride.

Figure 8:
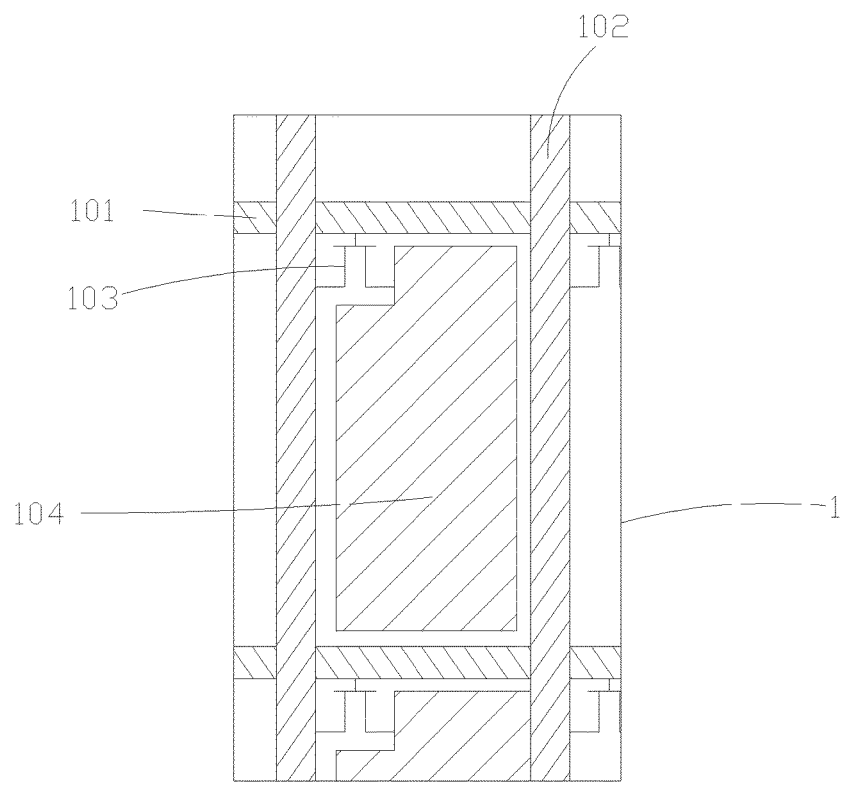
FIG. 8 is a plan diagram of one side of the first flexible substrate in the liquid crystal panel according to the present invention.

Furthermore, as shown in FIG. 8, gate lines 101, data lines 102, TFTs 103 and ITO pixel electrodes 104 are located on another. The seal glue 7 is coated at a side of the spacing retaining wall 5 close to the first flexible substrate 1 to bond the first and the second flexible substrates 1, 3 together and block flowing of the liquid crystal in the panel for stably supporting the cell gap between the first and the second flexible substrates 1, 3. Thus, the evenness of the cell gap in a liquid crystal layer of a bent liquid crystal panel can be well maintained for being adaptable for flexible display. Besides, a seal frame is generally employed in a traditional liquid crystal panel for adhering the upper and lower substrates. The liquid crystal panel of the present invention is different from the traditional liquid crystal panel. No seal frame is set but the seal glue 7 is employed for adhering the first flexible substrate 1 and the second flexible substrate 3. Without the seal glue 7, the first flexible substrate 1 and the second flexible substrate 3 cannot be bonded.

Significantly, the seal glue 7 is UV-curing and heat-curing complex glue, and is cured by a complex way of UV curing and heat curing. In the compositions, at least one prepolymer comprises acrylate group of UV curing and epoxy group of heat curing. After the seal glue 7 is cured by a complex way of UV curing and heat curing, the first flexible substrate 1 and the second flexible substrate 3 can be bonded together, tightly and firmly. The seal glue 7 is coated on a side of the spacing retaining wall 5 close to the first flexible substrate 1 and directly attached to the spacing retaining wall 5, this being easy for manufacturing and allowing for co-working with the spacing retaining wall 5 for blocking the flowing of the liquid crystal in the panel.

Figure 10:
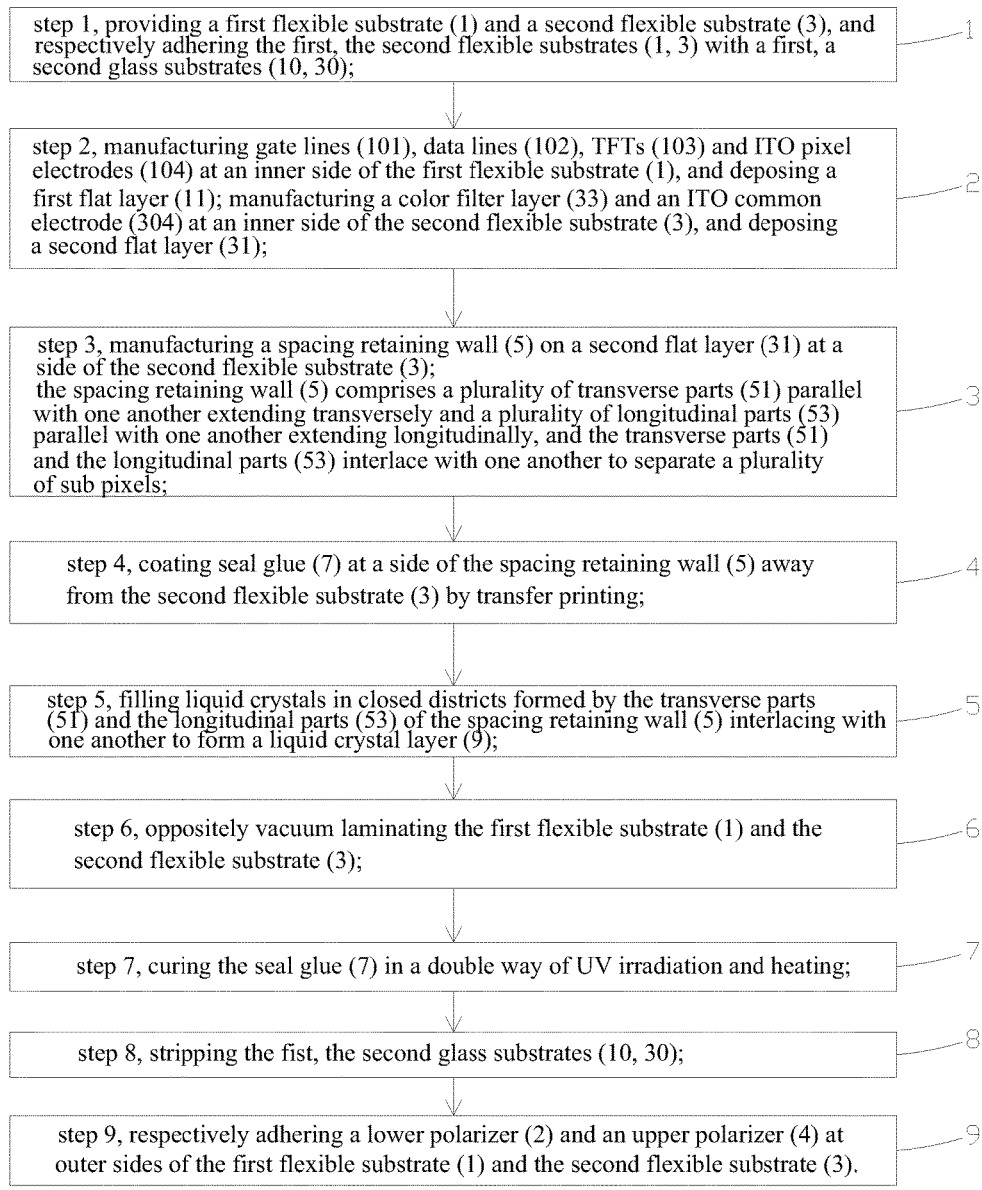
FIG. 10 is a flowchart of a manufacture method of a flexible liquid crystal panel according to the present invention
Figure 11:
FIG. 11 is a diagram of step 1 of the manufacture method of the flexible liquid crystal panel according to the present invention.

Referring to FIG. 10, the present invention further provides a manufacture method of a flexible liquid crystal panel, comprising the following steps:

Step 1, referring to FIG. 11, providing a first flexible substrate 1 and a second flexible substrate 3, and respectively adhering the first and second flexible substrates 1, 3 with a first and a second glass substrates 10, 30.

Both the first flexible substrate 1 and the second flexible substrate 3 are transparent and flexible. Specifically, both the first flexible substrate 1 and the second flexible substrate 3 are plastic substrates, and preferably, the first flexible substrate 1 and the second flexible substrate 3 are PI substrates or PET substrates.

By adhering the first and the second flexible substrates 1, 3 with a first and a second glass substrates 10, 30, the first and the second flexible substrates 1, 3 can be throughout in plane state under high temperature conditions of the following steps.

Figure 12:
FIGS. 12 and 13 are diagrams of step 2 of the manufacture method of the flexible liquid crystal panel according to the present invention.

Step 2, referring to FIG. 12 in combination with FIG. 8, manufacturing gate lines 101, data lines 102, TFTs 103 and ITO pixel electrodes 104 on an inner side of the first flexible substrate 1 and deposing a first flat layer 11.

Figure 13:
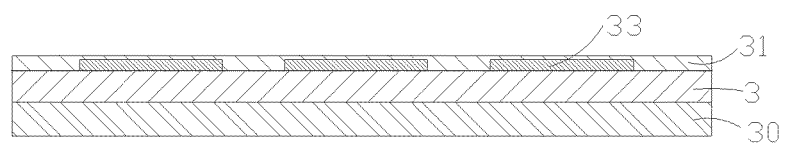
Figure 14:
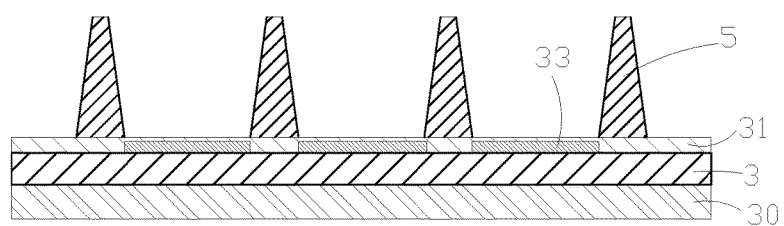
FIG. 14 is a diagram of step 3 of the manufacture method of the flexible liquid crystal panel according to the present invention.

Referring to FIG. 13 in combination with FIG. 9, manufacturing a color filter layer 33 and an ITO common electrode 304 on an inner side of the second flexible substrate 3 and deposing a second flat layer 31.

Step 3, referring to FIG. 13 in combination with FIG. 6, manufacturing a spacing retaining wall 5 on a second flat layer 31 at a side of the second flexible substrate 3 with a photo process.

The spacing retaining wall 5 comprises a plurality of transverse parts 51 parallel with one another and extending transversely and a plurality of longitudinal parts 53 parallel with one another and extending longitudinally, and the transverse parts 51 and the longitudinal parts 53 interlace with one another to separate a plurality of sub pixels.

Figure 15:
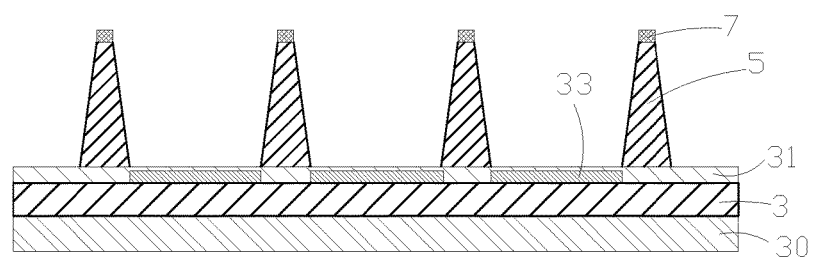
FIG. 15 is a diagram of step 4 of the manufacture method of the flexible liquid crystal panel according to the present invention.

Step 4, referring to FIG. 15, coating seal glue 7 at a side of the spacing retaining wall 5 away from the second flexible substrate 3 by transfer printing.

The seal glue 7 is UV-curing and heat-curing complex glue, and is cured by a complex way of UV curing and heat curing. The compositions of the seal glue 7 are prepolymer resin, viscosity modifier, photoinitiator, heat curing agent and filler.

Specifically, a ratio of total weight of the prepolymer resin is 10%-60%, and the prepolymer resin comprises one or many of prepolymer resins having polymerizable group (such as: acrylate group, methacrylate group, epoxy group), wherein the at least one prepolymer resin comprises acrylate group of UV curing and epoxy group of heat curing. It can be but not restricted to be:

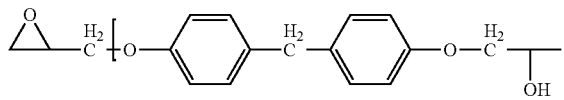

where n is an integer of 0-10.

A ratio of total weight of the viscosity modifier is 5%-30%, and the viscosity modifier is reactive monomer having polymerizable group, which the molecular weight is smaller and the viscosity is lower. It can be but not restricted to be:

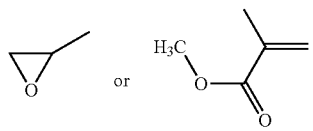

A ratio of total weight of the photoinitiator is 0.05%-1%, and the photoinitiator can be a CIBA IRGACURE series of photoinitiator, such as CIBA IRGACURE651, and the structure is provided below:

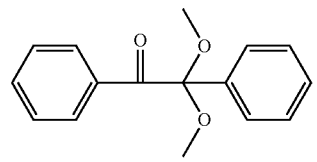 [SMILES: COC(OC)(C(=O)c1ccccc1)c1ccccc1]

A ratio of total weight of the heat curing agent is 10%-40%, and the heat curing agent is a compound of anhydride series or amine series. It can be but not restricted to be:

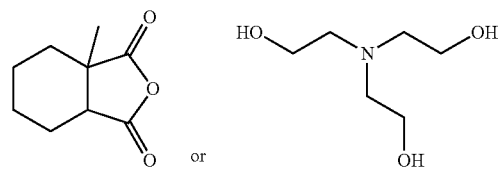

A ratio of total weight of the filler is 5%-20%, and the filler is inorganic granular substance selected from silicon dioxide, aluminum oxide, zinc oxide, titanium oxide, magnesium oxide, calcium sulfate, aluminum nitride or silicon nitride.

Figure 16:
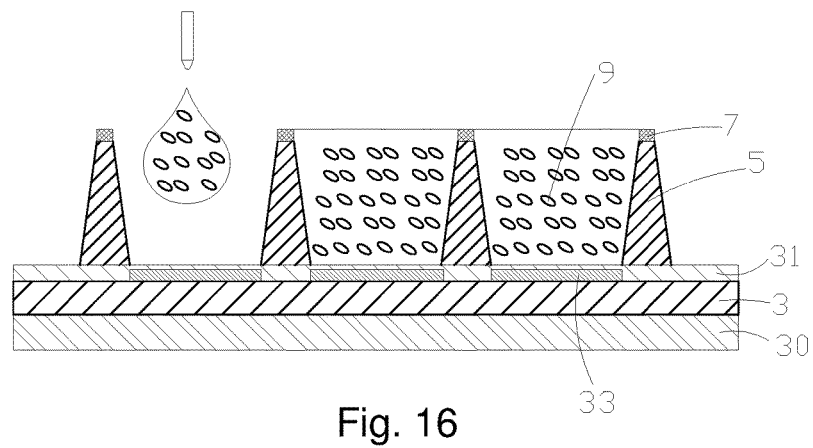
FIG. 16 is a diagram of step 5 of the manufacture method of the flexible liquid crystal panel according to the present invention.

Step 5, referring to FIG. 16, filling liquid crystal in closed districts formed by the transverse parts 51 and the longitudinal parts 53 of the spacing retaining wall 5 interlacing with one another to form a liquid crystal layer 9 by spraying.

Figure 17:
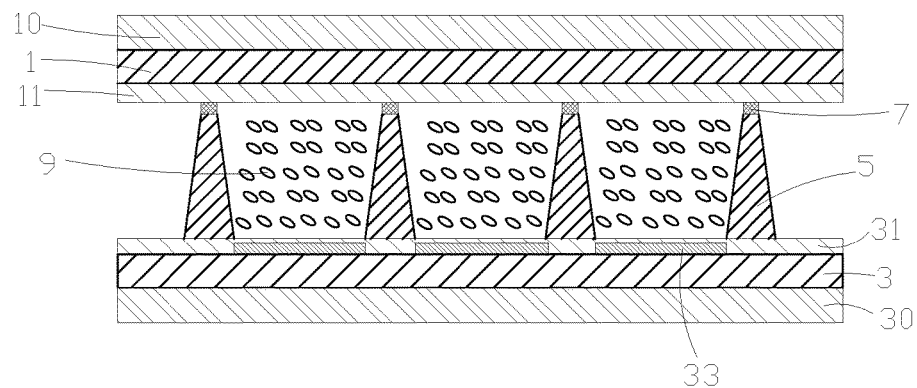
FIG. 17 is a diagram of the step 6 of the manufacture method of the flexible liquid crystal panel according to the present invention.

Step 6, referring to FIG. 17, oppositely vacuum laminating the first flexible substrate 1 and the second flexible substrate 3.

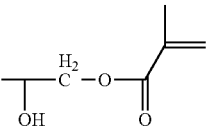

Figure 18:
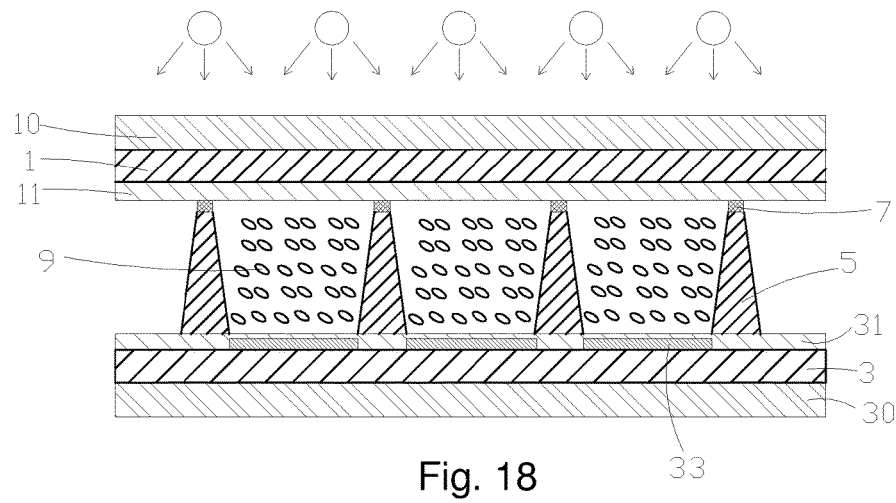
FIGS. 18 and 19 are diagrams of step 7 of the manufacture method of the flexible liquid crystal panel according to the present invention.
Figure 19:
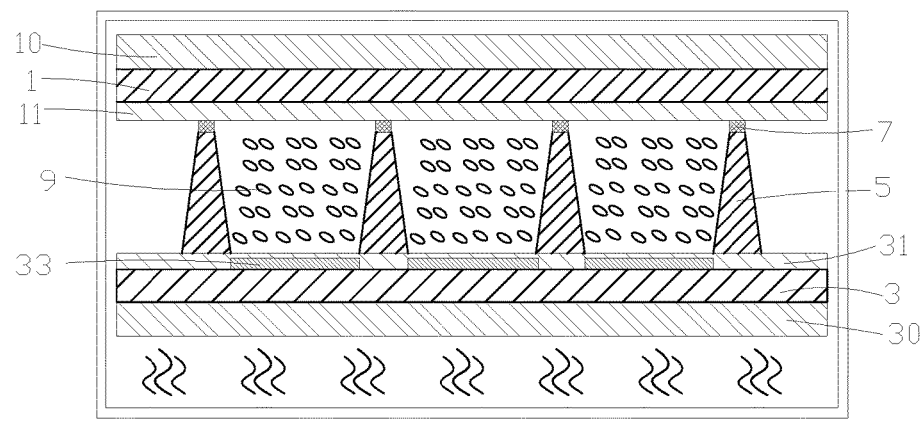

Step 7, referring to FIGS. 18 and 19, curing the seal glue 7 in a combined way of UV irradiation and heating to realize a better curing result, and bonding the first flexible substrate 1 and the second flexible substrate 3 together, more firmly and more tightly, for achieving the package of the first flexible substrate 1 and the second flexible substrate 3 to the liquid crystal layer 9 better.

Figure 20:
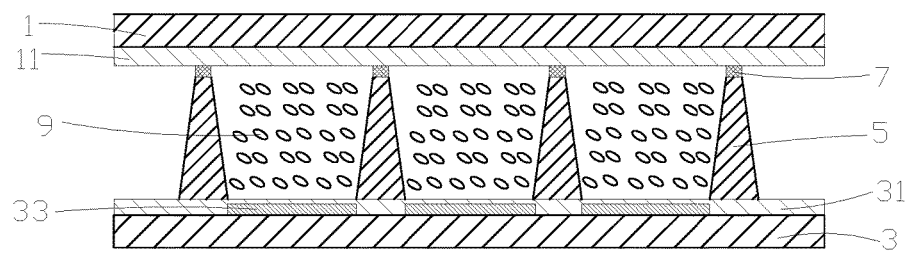
FIG. 20 is a diagram of step 8 of the manufacture method of the flexible liquid crystal panel according to the present invention.

Step 8, referring to FIG. 20, stripping the first and the second glass substrates 10, 30.

Step 9, referring to FIG. 5, respectively adhering a lower polarizer 2 and an upper polarizer 4 to outer sides of the first flexible substrate 1 and the second flexible substrate 3.

Thus, the manufacture of the flexible liquid crystal panel is accomplished. In the aforesaid manufacture method of the flexible liquid crystal panel, the spacing retaining wall 5 is manufactured with a photo process and the seal glue 7 is coated on a side of the spacing retaining wall 5 away from the second flexible substrate 3 by transfer printing. The liquid crystal layer 9 is filled in the closed districts formed by the transverse parts 51 and the longitudinal parts 53 of the spacing retaining wall 5 interlacing with one another. Thus, the issue of the uneven cell gap in a liquid crystal layer of a bent liquid crystal panel according to prior art is eliminated to allow the liquid crystal panel adaptable for flexible display.

In conclusion, in the flexible liquid crystal panel of the present invention, by locating the spacing retaining wall on a side of the second flexible substrate, and coating the seal glue on a side of the spacing retaining wall close to the first flexible substrate to bond the first and the second flexible substrates together for stably supporting the cell gap between the two substrates, and firmly blocking the flow of the liquid crystals in the panel, the evenness of the cell gap in a liquid crystal layer of a bent liquid crystal panel can be well maintained for being adaptable for flexible displaying. In the manufacture method of the flexible liquid crystal panel according to the present invention, the spacing retaining wall is manufactured with a photo process and the seal glue is coated on a side of the spacing retaining wall away from the second flexible substrate by transfer printing. Thus, the issue of the uneven cell gap in a liquid crystal layer of a bent liquid crystal panel according to prior art is eliminated to allow the liquid crystal panel adaptable for flexible display.

The above provides only specific embodiments of the present invention, and the scope of the present invention is not limited to these embodiments. For those skilled in the art, change or replacement that is easily derived should be covered by the protected scope of the invention. Thus, the protected scope of the invention should go by the subject claims.

What is claimed is:

1. A flexible liquid crystal panel, comprising:
   a first flexible substrate and a second flexible substrate arranged opposite to each other;
   a first flat layer arranged on an inner side of the first flexible substrate;
   a second flat layer arranged on an inner side of the second flexible substrate;
   a color filter layer arranged between the second flexible substrate and the second flat layer;
   a spacing retaining wall formed on the second flat layer;
   seal glue coated on one side of the spacing retaining wall that is adjacent to the first flexible substrate and adhesively attached to the first flat layer; and
   a layer of liquid crystal filled between the first flat layer and the second flat layer;
   wherein the spacing retaining wall comprises a plurality of transverse parts parallel with one another and extending transversely and a plurality of longitudinal parts parallel with one another and extending longitudinally, wherein the transverse parts and the longitudinal parts intersect one another to define a plurality of sub pixels that are separated from each other by the transvers parts and the longitudinal parts, and the liquid crystal is filled in closed districts delimited and defined by the transverse parts and the longitudinal parts intersecting one another;
   wherein the seal glue comprises a composition that comprises prepolymer resin, viscosity modifier, photoinitiator, a heat curing agent, and a filler; and
   wherein a ratio of total weight of the viscosity modifier is 5%-30% and the viscosity modifier is reactive monomer having a polymerizable group having a small molecular weight and a low viscosity.

2. The flexible liquid crystal panel as claimed in claim 1, wherein the first flexible substrate and the second flexible substrate are each a plastic substrate.

3. The flexible liquid crystal panel as claimed in claim 1, wherein the seal glue is complex glue comprising a composition comprising a heat curable agent and a UV curable agent.

4. The flexible liquid crystal panel as claimed in claim 1, wherein a ratio of total weight of the prepolymer resin is 10%-60% and the prepolymer resin comprises a composition comprising a polymerizable group.

5. The flexible liquid crystal panel as claimed in claim 4, wherein the prepolymer resin comprises a UV curable acrylate group and a heat-curable epoxy group.

6. The flexible liquid crystal panel as claimed in claim 1, wherein a ratio of total weight of the photoinitiator is 0.05%-1%.

7. The flexible liquid crystal panel as claimed in claim 1, wherein a ratio of total weight of the heat curing agent is 10%-40% and the heat curing agent is a compound of anhydride series or amine series.

8. The flexible liquid crystal panel as claimed in claim 1, wherein a ratio of total weight of the filler is 5%-20% and the filler is an inorganic granular substance of silicon dioxide, aluminum oxide, zinc oxide, titanium oxide, magnesium oxide, calcium sulfate, aluminum nitride or silicon nitride.

9. The flexible liquid crystal panel as claimed in claim 1 further comprising a lower polarizer attached to an outer side of the first flexible substrate and an upper polarizer attached to an outer side of the second flexible substrate.

10. The flexible liquid crystal panel as claimed in claim 1 further comprising gate lines, data lines, thin film transistors, and pixel electrodes that are arranged on the inner side of the first flexible substrate and a common electrode that is arranged on the inner side of the second flexible substrate.

11. The flexible liquid crystal panel as claimed in claim 1, wherein each of the plurality of longitudinal parts and the plurality of transverse parts comprises two opposite inclined side surfaces that are converging from a proximal side thereof located on the second flat layer of the second flexible substrate toward a distal side distant from the second flat layer of the second flexible substrate.

12. The flexible liquid crystal panel as claimed in claim 11, wherein the distal side of each of the plurality of longitudinal parts and the plurality of transverse parts define an end surface on which seal glue is coated for attaching the distal side of each of the plurality of longitudinal parts and the plurality of transverse parts to the first flat layer of the first flexible substrate.

13. A flexible liquid crystal panel, comprising:
   a first flexible substrate and a second flexible substrate arranged opposite to each other;
   a first flat layer arranged on an inner side of the first flexible substrate;
   a second flat layer arranged on an inner side of the second flexible substrate;
   a color filter layer arranged between the second flexible substrate and the second flat layer;
   a spacing retaining wall formed on the second flat layer;
   seal glue coated on one side of the spacing retaining wall that is adjacent to the first flexible substrate and adhesively attached to the first flat layer; and
   a layer of liquid crystal filled between the first flat layer and the second flat layer;
   wherein the spacing retaining wall comprises a plurality of transverse parts parallel with one another and extending transversely and a plurality of longitudinal parts parallel with one another and extending longitudinally, wherein the transverse parts and the longitudinal parts intersect one another to define a plurality of sub pixels that are separated from each other by the transvers parts and the longitudinal parts, and the liquid crystal is filled in closed districts delimited and defined by the transverse parts and the longitudinal parts intersecting one another; and wherein each of the plurality of longitudinal parts and the plurality of transverse parts comprises two opposite inclined side surfaces that are converging from a proximal side thereof located on the second flat layer of the second flexible substrate toward a distal side distant from the second flat layer of the second flexible substrate;

wherein the seal glue comprises a composition that comprises prepolymer resin, viscosity modifier, photoinitiator, a heat curing agent, and a filler; and wherein a ratio of total weight of the viscosity modifier is 5%-30% and the viscosity modifier is reactive monomer having a polymerizable group having a small molecular weight and a low viscosity.

14. The flexible liquid crystal panel as claimed in claim 13, wherein the first flexible substrate and the second flexible substrate are each a plastic substrate.

15. The flexible liquid crystal panel as claimed in claim 13, wherein the seal glue is complex glue comprising a composition comprising a heat curable agent and a UV curable agent.

16. The flexible liquid crystal panel as claimed in claim 13, wherein the distal side of each of the plurality of longitudinal parts and the plurality of transverse parts define an end surface on which seal glue is coated for attaching the distal side of each of the plurality of longitudinal parts and the plurality of transverse parts to the first flat layer of the first flexible substrate.

* * * * *